United States Patent [19]
Shisgal et al.

[11] Patent Number: 5,574,426
[45] Date of Patent: Nov. 12, 1996

[54] OBSTACLE DETECTION SYSTEM FOR VEHICLES MOVING IN REVERSE

[75] Inventors: Ben Z. Shisgal, Karmiel; Hanan Anderman, Haifa; Yosef Fashchik, Karmiel; Yariv Porat, Haifa, all of Israel

[73] Assignee: Insys, Ltd., Karmiel, Israel

[21] Appl. No.: 497,429

[22] Filed: Jun. 30, 1995

[51] Int. Cl.$^6$ .................................... B60Q 1/00
[52] U.S. Cl. .................. 340/435; 340/436; 340/903; 340/904; 364/460; 180/271; 180/275; 367/96; 367/112; 367/909
[58] Field of Search .................. 340/435, 436, 340/901, 903, 904, 552, 561, 565, 461; 364/460, 461; 180/271, 275; 367/96, 97, 102, 112, 909, 107

[56] References Cited

U.S. PATENT DOCUMENTS

| | | |
|---|---|---|
| 4,467,313 | 8/1984 | Yoshino et al. . |
| 4,903,004 | 2/1990 | Starke et al. . |
| 4,910,512 | 3/1990 | Riedel . |
| 4,943,796 | 7/1990 | Lee . |
| 4,974,215 | 11/1990 | Bolz et al. . |
| 5,004,997 | 4/1991 | Shisgal et al. . |
| 5,214,408 | 5/1993 | Asayama . |
| 5,304,980 | 4/1994 | Maekawa . |
| 5,321,255 | 6/1994 | Kakinami et al. . |

FOREIGN PATENT DOCUMENTS 2266397  10/1993  United Kingdom .

OTHER PUBLICATIONS

ISO Technical Report. *Commercial vehicles–Obstacle detection device during reversing—Requirements and tests.* 12155, first edition; Oct. 1, 1994.

*Primary Examiner*—Jeffery Hofsass
*Assistant Examiner*—Nina Tang
*Attorney, Agent, or Firm*—Banner & Allegretti, Ltd.

[57] ABSTRACT

An electronic obstacle detection system for guiding and warning a motorist of obstacles in the detection area while backing-up. The main components of the system include a pair of sensor clusters to be affixed to the rear of the vehicle, a pair of exterior visual indicators, and an audio-visual indicator located in the vehicle. Each of the sensor clusters are encased in a housing having angled, stepped portions configured to provide complete area coverage of transmitted and received signals.

21 Claims, 9 Drawing Sheets

OBSTACLE DETECTION SYSTEM FOR VEHICLES MOVING IN REVERSE

FIELD OF THE INVENTION

The present invention relates to blind spot obstacle detection systems which alert and warn the driver of a vehicle to the presence of all potentially hazardous obstacles located behind the vehicle when in reverse gear.

BACKGROUND OF THE INVENTION

The problems associated with blind spots while moving a vehicle in reverse have long been recognized. There have been repeated accidents associated with vehicles backing-up involving personal injury and damage to property. As vehicles are generally operated by one person, drivers will often back-up without adequate visibility to the rear. Even the presence of a passenger who can help in spotting obstacles or a person standing behind the vehicle to guide the driver does not wholly eliminate the blind spot to the driver.

Technical aids to improve vision to the rear by short range obstacle or target detection and distance measurement have, therefore, been developed in recent years and introduced into the market. These devices generally fall into three categories: (i) optical systems using image sensors, infrared light, video or laser devices, (ii) conductivity measurement systems, and (iii) ultrasound systems.

As to the optical systems, U.S. Pat. Nos. 5,214,408 to Asayama and 5,304,980 to Maekawa disclose target detection systems using light sensitive image sensors for optically sensing two image signals from an object, comparing the two signals and calculating the distance to the object based on the deviation between the images using triangulation. The systems utilize dual lenses mounted at the front of the vehicle to measure the distance from a leading vehicle by comparing the two images received by each of the two lenses. An infrared light generating means is also provided for projecting infrared light toward the object when atmospheric light is insufficient. Some of the problems associated with these image sensor systems include poor resolution at very close distances which makes it unsuitable for backing-up applications; poor performance in situations of impaired visibility such as inclement weather, dust, smog and especially fog; the susceptibility of the lenses to damage or ineffectiveness due to dirt, dust, snow or rain; and the relative expense of such systems.

Another type of optical system involves video systems which consist of a camera mounted on the upper rear portion of the vehicle, and a monitor on the instrument panel or above the dashboard inside the vehicle. Video systems came into use in several special applications such as buses, airport apron vehicles, and the like. These devices have many disadvantages such as poor night vision, their inability to gauge the distance between the vehicle and the obstacle, and severe safety problems associated with the driver being distracted and preoccupied trying to observe the video monitor and use the side view mirrors while moving the vehicle in reverse.

Yet another optical system is a distance measurement system using lasers. These systems also suffer from the disadvantage of poor performance under adverse weather conditions, and are also unable to measure dose distances such as those under three meters.

Conductivity measurement systems as that disclosed in British Patent No. UK 2,266,397 are based on changes in the capacitance in the environment and are generally effective for a very short range, on the order of approximately 30 cm. The conductive strip must be mounted across the full width of the rear of the vehicle, and adverse weather conditions such as rain and snow may change the conductive field which may result in false alarms.

Ultrasonic systems are cited by industry experts as the preferred technology including ISO Technical Report ISO/TR 12155 published by the International Organization for Standardization. Various ultrasonic systems have been proposed, and include those employing basic ultrasonic signal transmitting and receiving circuitry. The technology is suitable for all weather and visibility circumstances, and provides the optimal performance in short distance measurement and target detection due to the lower speed of sound. A signal is transmitted and the echo is deflected to the receiver providing an indication of presence and distance of a target based on the speed of sound. The disadvantages of these devices in general include an inability to measure at very short distances due to cross-talk between the transmitter and receiver, and poor area coverage and the inability to detect targets of irregular shapes and/or sizes. These limitations are inherent in commercially available ultrasonic devices, systems or transducers whose lobes do not provide coverage of the entire blind spot behind a vehicle, and which are susceptible to failure when the transmitted signals are deflected from oddly shaped obstacles or targets. These drawbacks limit the usefulness of conventional ultrasonic devices to parking aids where any detected objects are large, such as loading docks or neighboring vehicles.

Figure 9:
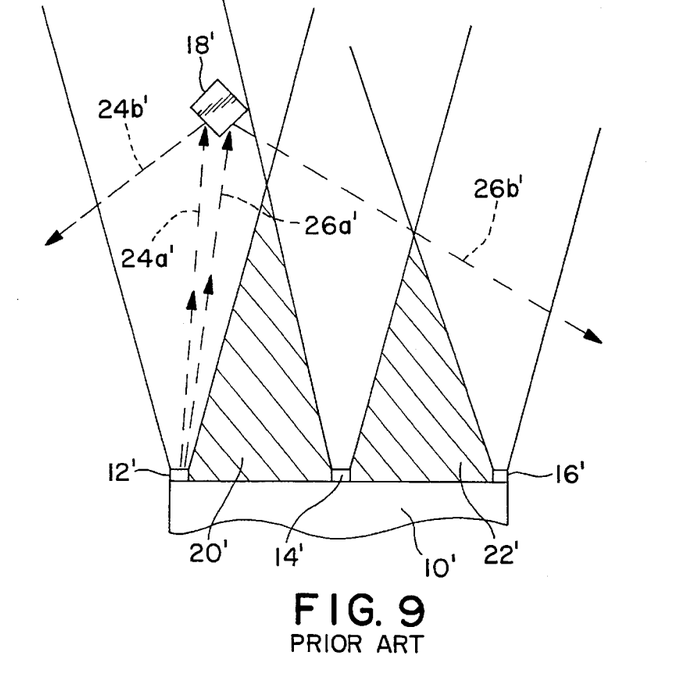
FIG. 9 is a schematic top view of a detection area and obstacle showing the coverage provided by a prior art detection system.

An example of a conventional ultrasonic system is disclosed in U.S. Pat. No. 4,467,313 to Yoshino et al. which employs three obstacle detectors mounted along the rear of a vehicle in perpendicular relation to the bumper. Each obstacle detector comprises an ultrasonic transducer for transmitting and receiving an ultrasonic wave and an analog switch, and covers a set watching area. One of the drawbacks of this system is that some areas not directly in front of a detector remain blind areas. Prior art FIG. 9 is a schematic representation of the angular configuration of the watching areas in which primed reference numerals are used. It is a top view of a portion of vehicle 10' having three obstacle detectors 12', 14' and 16' mounted in parallel, and an obstacle 18'. Each detector has an angular coverage area, and it can be seen that some areas close to the detectors remain uncovered. Those uncovered areas are labeled 20' and 22' and are indicated with hatching. Widening the angle of coverage to address this problem results in a significant decrease in the signal strength thereby reducing the distance that can be covered.

Another problem with conventional systems such as that pictured in FIG. 9 is that the use of transducers in parallel relation to one another may miss certain angular hazards due to deflection of the transmitted signal away from any receivers. In FIG. 9 two signals 24a' and 26a' are transmitted from detector 12' toward obstacle 18' which has an angular shape or orientation. Due to the shape of obstacle 18', deflected signals 24b' and 26b' travel away from any receiving sensors of the detectors and obstacle 18' is not detected.

SUMMARY OF THE INVENTION

It is the objective of the invention to provide a back-up warning device for assisting a driver in the detection of obstacles of most any shape while providing sufficient warning time to stop at an adequate distance from the obstacle. The drawbacks associated with existing devices are substantially reduced or eliminated.

According to the broad aspect of the invention there is provided an electronic obstacle detection system for guiding and warning a motorist of obstacles in a detection area while backing-up. The main components of the system include a pair of sensor clusters to be affixed to the rear of the vehicle, a pair of exterior visual indicators, and an audio-visual indicator located in the vehicle. Each of the sensor clusters are encased in a housing which is configured to provide complete detection area coverage of transmitted and received signals. The system is preferably powered by power source within the vehicle.

A problem with operating any vehicle, but larger ones in particular such as buses and trucks, is the blind spot to the rear of the vehicle. The present system detects objects in at least three zones of a detection area which refers to the area behind the vehicle within which the system can detect obstacles: a close collision zone directly behind the vehicle, a warning zone further behind the vehicle, and a pre-warning zone behind the warning zone. Due to the configuration of the sensor clusters and their position on the back of the vehicle, there are no gaps in coverage and the entire horizontal detection area is covered.

In addition, the present system allows for operation of the sensor clusters in both monostatic and bistatic modes thereby enabling the system to receive return signals deflected from odd shaped hazards which may have been missed by conventional systems. The term "monostatic" in this context refers to the transmission of a signal and reception of the return signal by the same sensor pair; and the term "bistatic" refers to the transmission of a signal by one sensor and reception of the return signal by a non-paired receiver. By providing for both monostatic and bistatic operation, the location of any targeted obstacle and the distance from it to the vehicle can be determined with more accuracy than with conventional systems.

The detection system of the present invention is not susceptible to "dead" areas or gaps in coverage between sensors, and can detect oddly shaped hazards, particularly angular ones which tend to deflect transmitted signals away from receivers of conventional systems. Redundancy is build into the system so that damage to or failure of any individual sensor does not impair the overall functioning of the system. The present system is not affected by adverse weather conditions or limited visibility. Moreover the system can be installed easily to most vehicles regardless of the rear configuration and the locations of the sensor clusters do not affect the operation of lift gates on most trucks.

Another aspect of the present invention are the visual and audio warning signals. Exterior visual indicators comprise a pair of light signal devices mounted on the driver and passenger sides of the vehicle. The signal devices are located so that they are visible to the driver through the side view mirrors mounted on the sides of the vehicle. Their location enables the driver to maneuver the vehicle without any distraction since the side view mirrors are used in backing-up. The signal devices have a plurality of warning lights which are lit to indicate the level of warning given to the driver. Inside the vehicle, an audio-visual warning may be provided to the driver by a panel having lights which correspond to the exterior light signals and an audible alarm.

These and other features and advantages of the invention may be more completely understood from the following detailed description of the preferred embodiment of the invention with reference to the accompanying drawings.

DETAILED DESCRIPTION OF THE PREFERRED EMBODIMENTS

Figure 1:
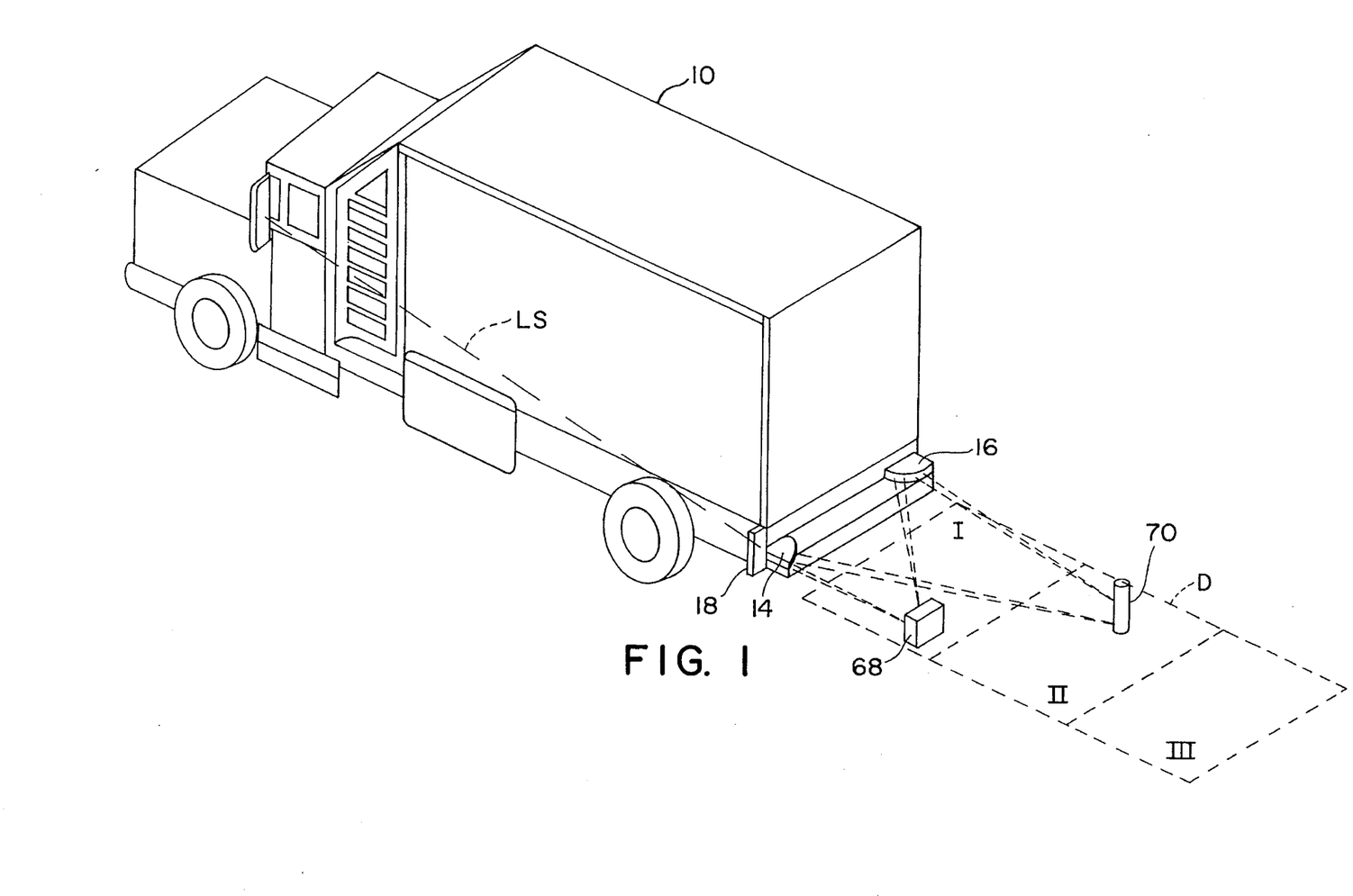
FIG. 1 is a rear perspective view of a vehicle with the obstacle detection system of the present invention mounted thereon and shown with obstacles and a schematically drawn detection area.
Figure 2:
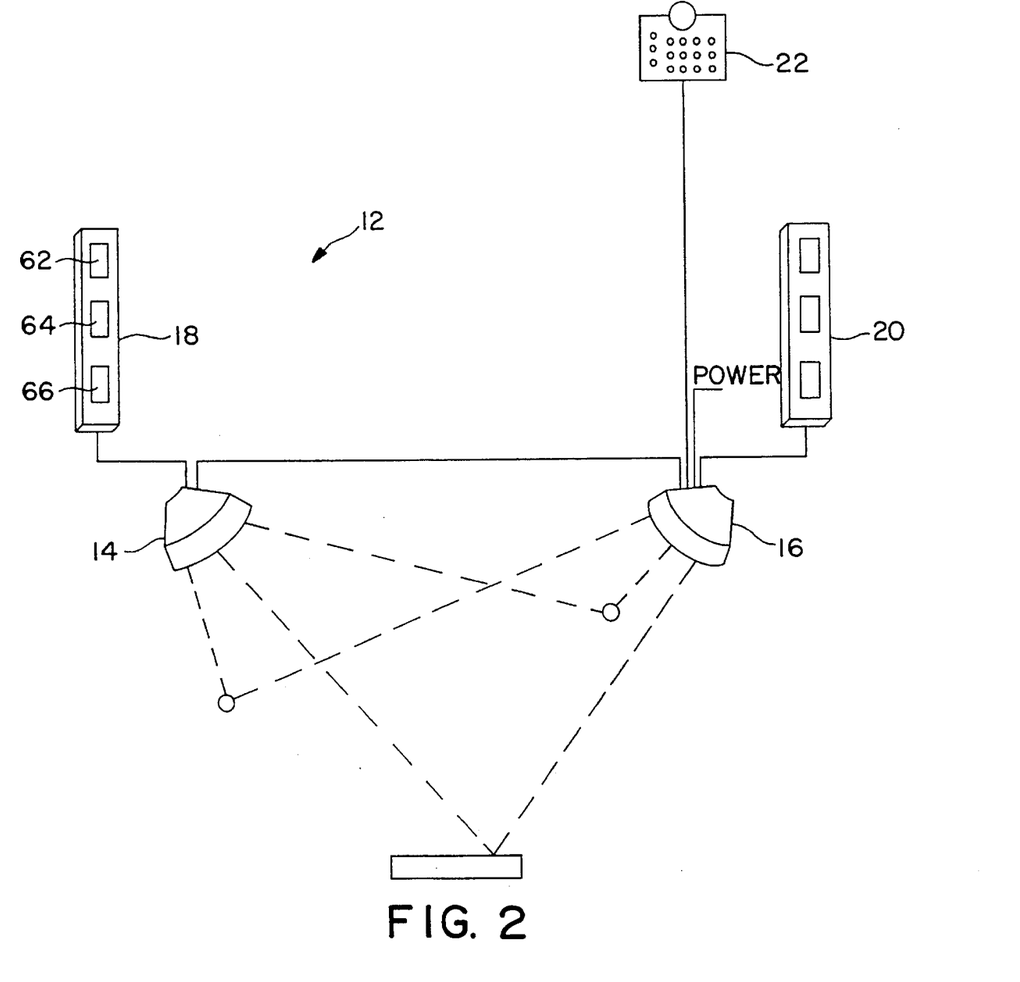
FIG. 2 is a schematic representation of the main components of the obstacle detection system of the present invention shown with obstacles.
Figure 3:
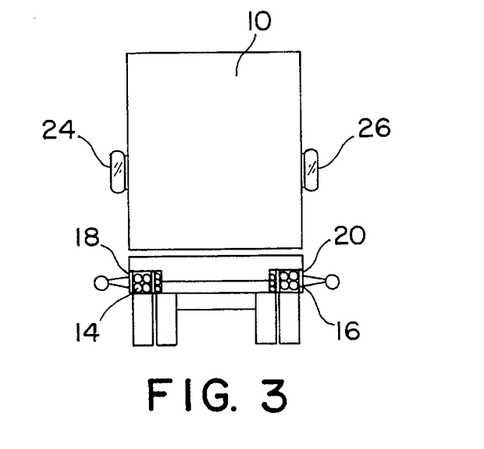
FIG. 3 is a rear elevational view of a vehicle showing the main components of the obstacle detection system of the present invention.
Figure 4:
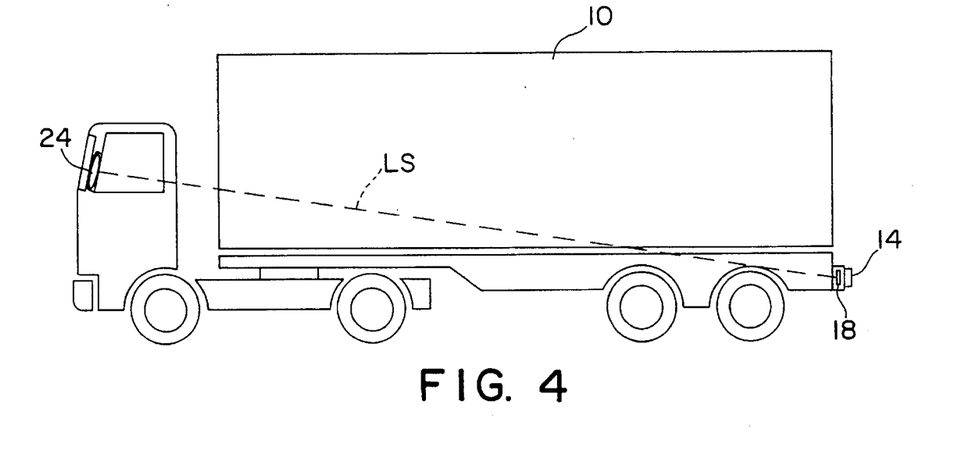
FIG. 4 is a side elevational view of the vehicle of FIG. 3.
Figure 5:
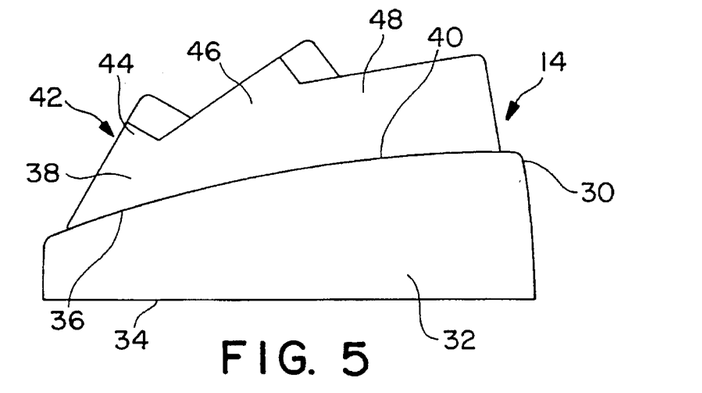
FIG. 5 is a top plan view of a sensor cluster and housing.
Figure 6:
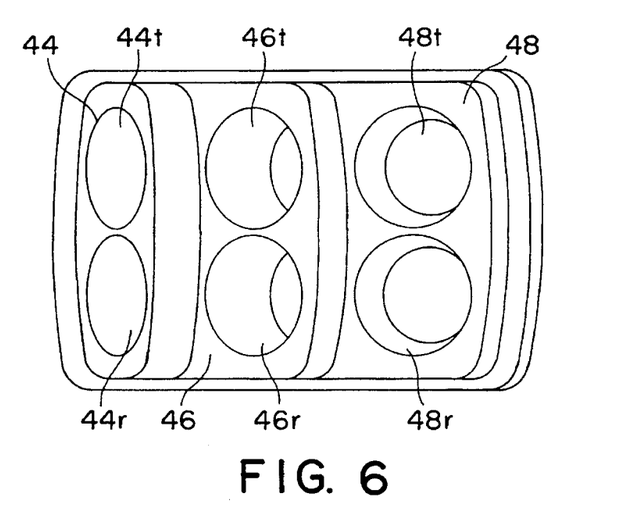
FIG. 6 is elevational view of the sensor cluster of FIG. 5 viewed from the rear of the vehicle.
Figure 7:
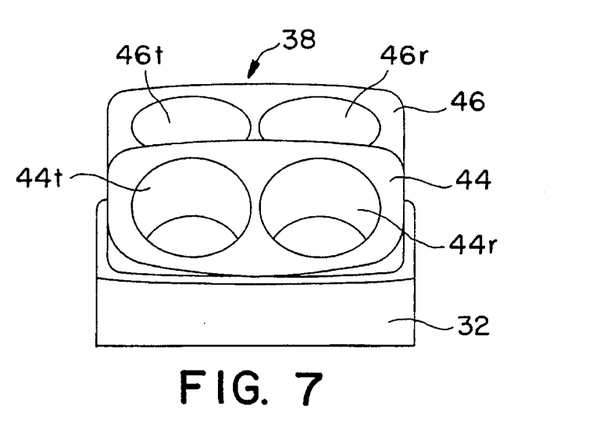
FIG. 7 is a side elevational view of the sensor cluster of FIG. 5.

Referring to FIG. 1 which is a perspective view of a vehicle 10 and its detection area D located to the rear of the vehicle. Two of the three principal components of obstacle detection system 12 are shown in FIG. 1, both sensor clusters 14 and 16, and one exterior visual indicator 18, the second exterior visual indicator 20 is located on the other side of the vehicle and therefore is not pictured in FIG. 1. In FIGS. 1–4, 8 and 10, ultrasonic sensor clusters 14 and 16 are shown schematically as triangular or quarter circle shapes. The actual shape of a sensor cluster is shown in FIGS. 5–7 as described below. All of the components of detection system 12 are pictured schematically in FIG. 2, including exterior visual indicator 20 and audio-visual panel 22. Vehicle 10 has side view minors 24 and 26 mounted on the sides of the cab, and exterior visual indicators 18 and 20 are attached to the vehicle in locations which are in the lines of sight of mirrors 24 and 26 respectively, FIG. 3. Exemplary lines of sight are labeled LS in FIGS. 1, 4 and 8. Due to the location of visual indicators 18 and 20, a driver is not distracted in using the detection system since attention will already be given to mirrors 24 and 26 when backing-up.

FIGS. 5–7 are detailed top, front and side views respectively of sensor cluster 14. Of course sensor cluster 16 is a mirror image of the one pictured in these figures, and it will be understood that all of the elements of cluster 14 are also present in cluster 16 accordingly. Sensor cluster 14 comprises a specially designed housing 30 having a vehicle attachment side 32 with an attachment edge 34 proximate the vehicle and a curved distal edge 36. Housing 30 also has a transceiving side 38 with a curved proximate edge 40 which defines the connection point with attachment side 32 and coincides with distal edge 36, and a stepped distal side 42.

Sensor cluster 14 is configured to be mounted on the rear of vehicle 10 on the driver's seat side, and transceiving side 38 of housing 30 has an angled shape having stepped portions containing pairs of transmitters and receivers. Housing 30 has a roughly triangular shape with the narrow portion toward the center of the vehicle and the wider portion toward the outer edge of the vehicle. In keeping with this general geometry, the curve of distal edge 36 of vehicle attachment side 32 extends from a narrower portion toward the center of the vehicle to a wider portion toward the outer edge. Attached to the distal edge of attachment side 32 is transceiving side 38 comprising three angled, stepped portions or surfaces, from the inside out, 44, 46 and 48.

Figure 8:
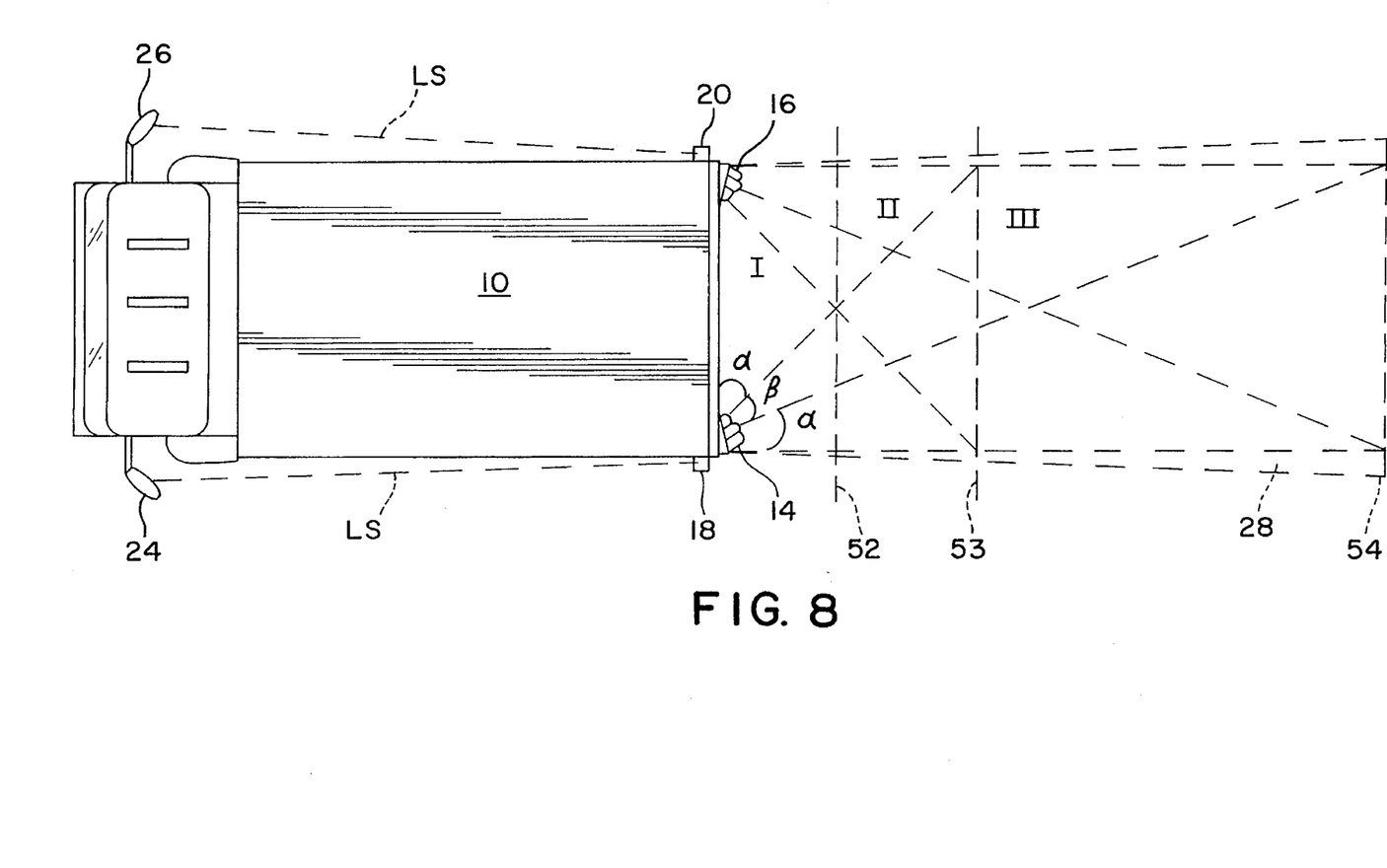
FIG. 8 is a top view of a vehicle and the detection area divided into zones.
Figure 10:
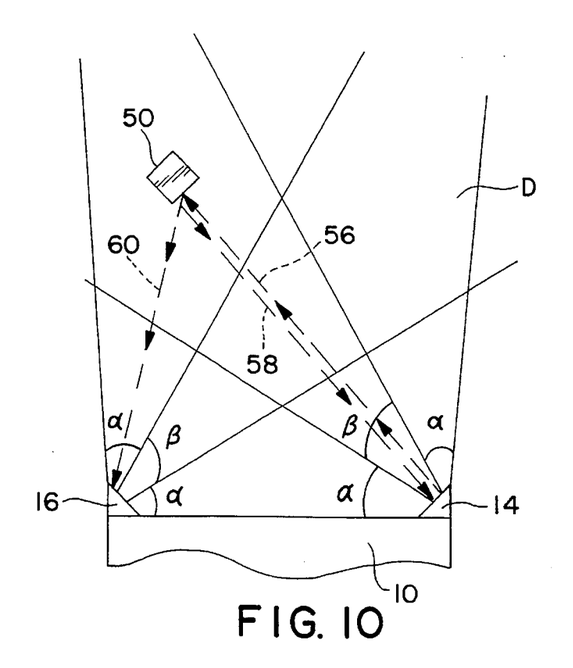
FIG. 10 is a schematic top view of a detection area and obstacle showing the coverage provided by the detection system of the present invention.

Each stepped portion includes an ultrasonic transmitter designated by a suffix "t" to the reference numeral, and an ultrasonic receiver designated by a suffix "r" to the reference numeral. In the preferred embodiment transmitters 44t, 46t and 48t are positioned above corresponding receivers 44r, 46r and 48r, and are referred to as transceiver pairs. Although the preferred embodiment employs transmitters and receivers, single unit transceivers which incorporate both functions may also be used. Any arrangement of transceiver pairs or single unit transceivers is contemplated to be within the scope of the invention. The angular relationships between stepped portions 44, 46 and 48 determine the amount of coverage of each transceiver pair. Stepped portions 44, 46 and 48 each cover areas having an approximate span of 30°. Referring to FIGS. 8 and 10, in the preferred embodiment, the angle labeled $\alpha$ illustrates the coverage area provided by the transceiver pairs of outer stepped portion 48 of sensor cluster 14. Similarly, angle $\beta$ illustrates the coverage area provided by the transceiver pair in middle stepped portion 46, and angle $\gamma$ illustrates the coverage area provided by the transceiver pair in inner stepped portion 44. The detection area D refers to the entire swath of coverage provided by sensor clusters 14 and 16 which is preferably equal to the width of the vehicle plus approximately 20 cm to each side of area D. This narrow alley provides an added field of detection at the edges of the area without confusing the driver between visible and non-visible obstacles. This additional lateral coverage is shown in FIG. 8 as alley 28. Of course sensor cluster 16 provides corresponding spans of coverage from its stepped portions, and the angles are labeled in FIG. 10.

In the manner described above, each sensor cluster covers approximately 90° which are divided into segments of approximately 30° each. The angled, stepped configuration of sensor clusters 14 and 16 provide coverage to the entire detection area D behind vehicle 10 with no gaps or "dead" spots. For example, in FIG. 10, an obstacle 50 is located within the $\alpha$ segment of sensor cluster 16 and the $\beta$ segment of sensor cluster 14. The lines of transmission and reception will be described herein with respect to the operation of the detection system.

Figure 11:
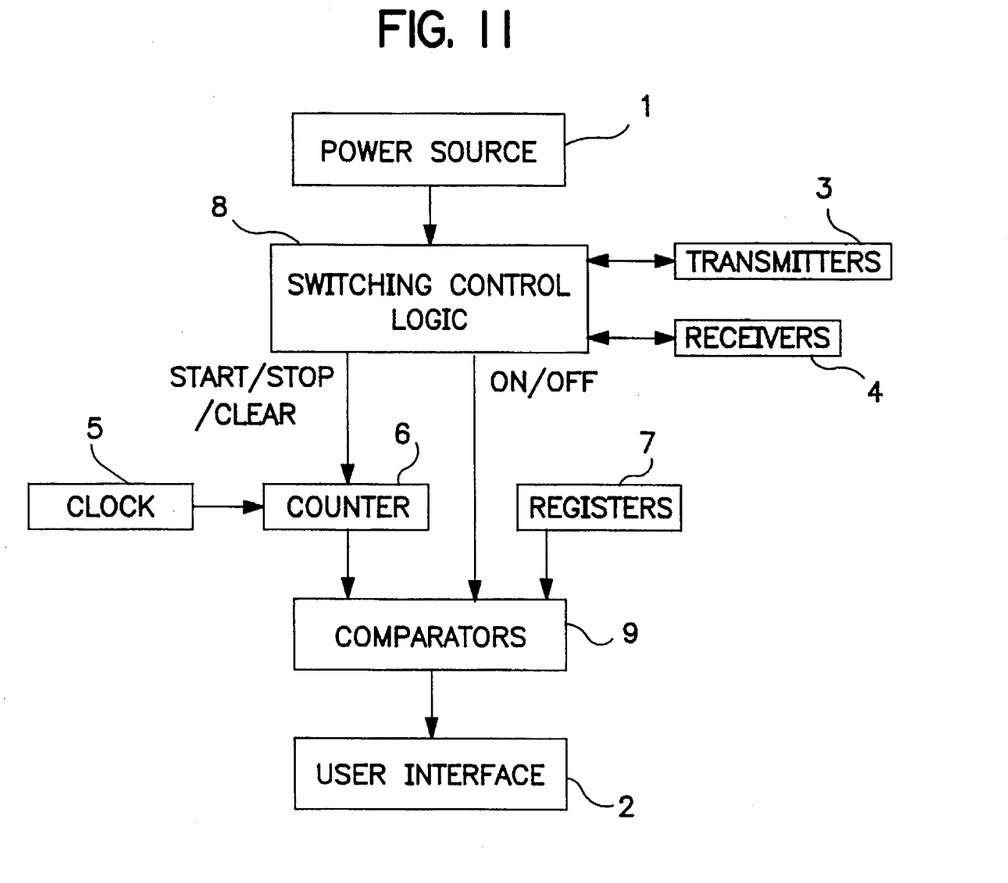
FIG. 11 is a simplified block diagram showing the components of the obstacle detection system of the present invention.

The base components of detection system 12 are shown in FIG. 11 and broadly comprise a microcomputer linked to a power source 1, a user interface 2 and transmitters 3 and receivers 4, or transceivers, which transmit the output signals and receive the input signals. The microcomputer functions can be performed using conventional circuit components, for example, a clock 5, a counter 6, registers 7, switching control logic 8 and comparators 9. Power is preferably supplied in parallel to the reverse lights of the vehicle so that the detection system is powered when the vehicle ignition switch is turned on and the vehicle is placed in reverse gear. The transmitters and receivers, as discussed above, are integrated into the sensor clusters.

The sensor clusters include transmitter arrays, such as 44t, 46t and 48t, for transmitting ultrasonic signals toward a target behind vehicle 10, and receiver arrays, such as 44r, 46r and 48r, for receiving return signals which are deflected from the target. As pictured, the sensor clusters are located at the two outer edges of the rear of the vehicle. Reception of the return signals occur in both monostatic and bistatic modes thereby enabling the logic circuit or computer to detect and calculate the distance of the closest targets within the coverage area.

As shown in FIG. 8, in addition to the angular segments of coverage provided by each transceiver pair, detection area D is also divided into proximity zones I, II and III. Proximity zone I is the zone closest to the back of the vehicle and extends to a predetermined distance indicated by broken line 52. Proximity zone II is further away from the vehicle and is bounded by line 52 and another broken line 53. Proximity zone III is behind zone II and is bounded by broken line 53 and another broken line 54. The distance from the back of the vehicle to line 52 is the minimum distance which will be allowed, and therefore proximity zone I is referred to as the imminent crash zone. The detection system will warn the driver to stop if any obstacle is detected in zone I. Proximity zone II is referred to as a warning zone, and the detection system will indicate that the driver is to proceed rearward with extreme caution if any obstacle is detected in zone II. Proximity zone III is referred to as a pre-warning zone, and the detection system will indicate that the driver is to proceed with caution if an obstacle is detected in zone III. If an obstacle is detected in the area beyond zone III, that is beyond line 54, the detection system will indicate an "all clear".

The distances of lines 52, 53 and 54 from the rear of the vehicle are predetermined to be the boundaries of the zones. Those distances correspond to predetermined first, second and third thresholds which are stored within the computer memory. Broadly, the operation of the computer involves comparing a detected distance with the thresholds and activating the appropriate warning signal.

Figure 12:
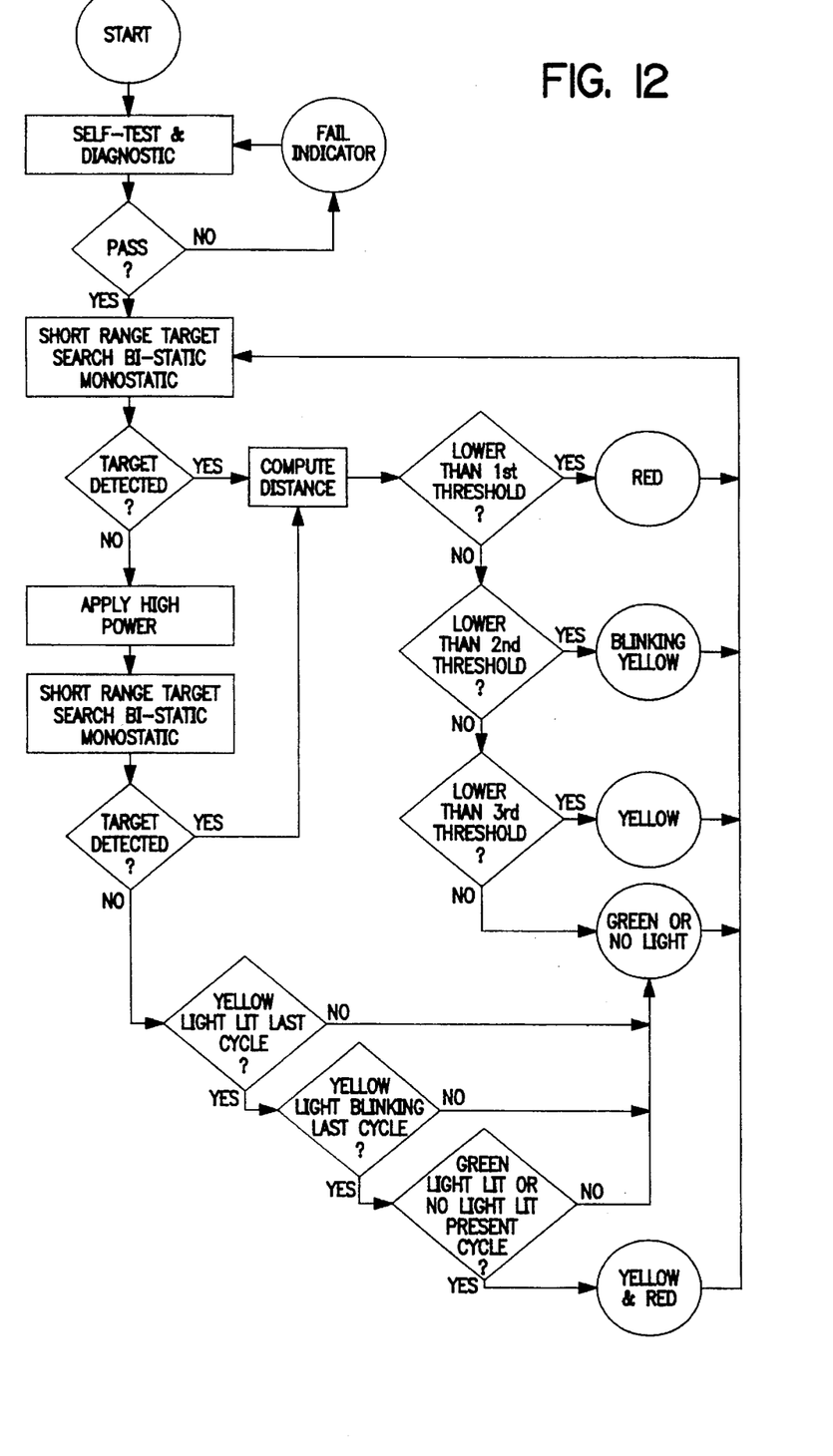
FIG. 12 is a flow diagram showing the principal operative steps of the obstacle detection system of the present invention.

Referring now to FIG. 12 there are shown the principal program steps of the computer. At the start of the procedure the computer preferably performs a self-test and undergoes diagnostic testing. Any failure in the diagnostic routine will be indicated and further operation stopped. If the self-test is passed, the computer will proceed to perform a detecting algorithm using input from the sensor clusters. The transmitters and receivers of the sensor clusters operate in both monostatic and bistatic modes. To better understand these modes, reference is made to FIG. 10 in which line 56 indicates an ultrasound signal transmitted from sensor cluster 14 toward obstacle 50. Due to the angular orientation of obstacle 50, the transmitted signal is deflected in two ways and will be received in two ways: monostatically referring to return signal 58 which is received by the same transceiver pair that sent it, and bistatically referring to return signal 60 which is received by a different transceiver pair located in sensor cluster 16. It will be understood that lines 56 and 58 should coincide but are shown separated for clarity of illustration. Because of the configuration of the sensor clusters and their shapes, the entire detection area behind the vehicle is covered as seen in FIG. 10. In contrast, in the prior art system shown in FIG. 9, the angularly oriented obstacle 18' is only within the area covered by one sensor 12', and the deflected signals 24b' and 26b' stray away from any receivers so that obstacle 18' should not be detected.

Exterior visual indicators 18 and 20 are preferably provided with different colored lights directed toward the side view mirrors. Similar to a traffic signal, top light 62 is red, middle light 64 is yellow, and bottom light 66 is green. The three lights form part of the user interface which communicates with the driver in response to obstacles detected behind the vehicle. As described above, an audible alarm may sound from the audio-visual panel 22, and FIG. 13 illustrates the audible signal outputs corresponding to the various thresholds of warning of the visual indicators.

The sensor clusters can detect a plurality of obstacles and the computer calculates the distance to the closest one. The computer calculates the distance by measuring the time lapse between the transmission of a signal and the receipt of its return signal, angle and the distance between the clusters. Stored within the computer memory is a first threshold corresponding to the minimum permitted distance between the back of the vehicle and the closest obstacle, that is the distance to line 52 in FIG. 8 covering zone I. A second threshold in memory is larger than the first threshold and corresponds to a distance from the back of the vehicle which is sufficiently close to warrant extreme caution, that is the distance to line 53 covering zone II. A third threshold in memory is larger than the second and corresponds to a distance which warrants caution in backing-up, that is the distance to line 54 covering zone III.

Figure 13:
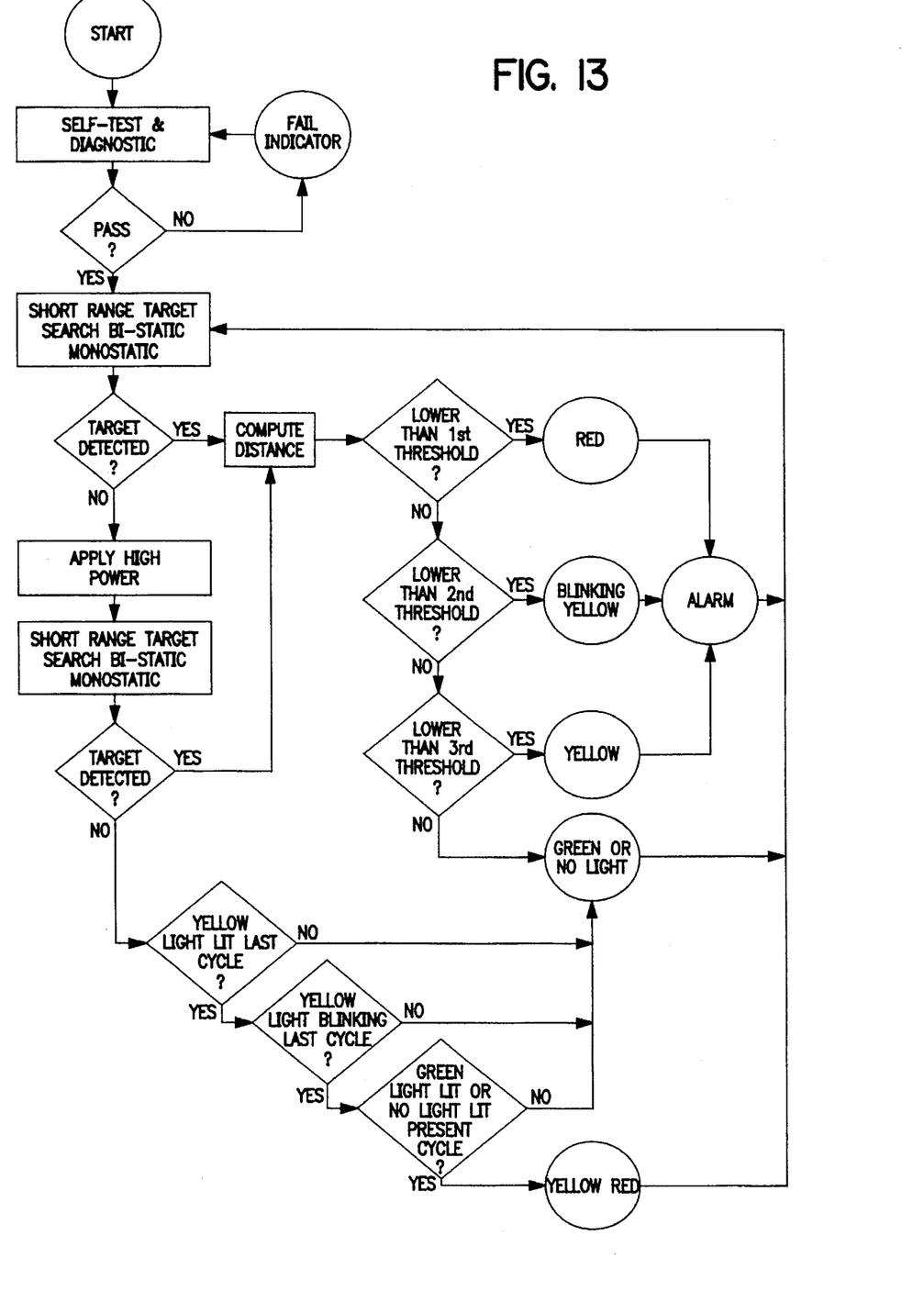
FIG. 13 is a flow diagram similar to FIG. 12 and including the audible alarm outputs.

Referring again to FIG. 12 and to FIG. 13, after the computer undergoes the self-test, a short range target search in both bistatic and monostatic modes is performed, and if a target obstacle is detected, the computer calculates the distance to the obstacle using a conventional computing technique. The computing technique uses a conventional clock/timer circuit to measure the difference between the time a signal or pulse is transmitted and a return signal or pulse is received by the sensor clusters. The detection system uses a multi-target screening technique which ensures that the first returned signal or pulse is used in the computing technique regardless of whether that returned signal or pulse was received monostatically or bistatically.

The calculated distance is compared with the first threshold and if it is less than the first threshold, a red light is illuminated on exterior visual indicators 18 and 20, by lighting top lights 62 indicating that an obstacle has been detected in collision zone I and signalling the driver to stop. In conjunction with the red lights, a specific audible signal corresponding to this warning may sound inside the vehicle from audio-visual panel 22. FIG. 13 illustrates the audible signal output. If the calculated distance is not less than the first threshold, it is compared with the second threshold. If the calculated distance is less than the second threshold, yellow lights are flashed by intermittently lighting middle lights 64 indicating that an obstacle has been detected in warning zone II and signalling the motorist to proceed with extreme caution. If the calculated distance is greater than the second threshold, it is compared with the third threshold, and if it is less than the third threshold, yellow lights are illuminated by lighting middle lights 64 indicating that an obstacle has been detected in pre-warning zone III and signalling the driver to proceed with caution. If the calculated distance is greater than the third threshold, then an "all clear" is indicated either by illuminating none of the lights or lighting green bottom lights 66 signalling the driver that no obstacles have been detected in detection zone D and to proceed with normal care and caution. With each of the above levels of warning, a suitable corresponding audible signal may sound from audio-visual panel 22 within the vehicle. Panel 22 may include a series of lights which correspond to the lights on exterior visual indicators 18 and 20, although these may be secondary to the exterior lights in function.

The target detection, distance calculation and visual and/or auditory indication steps are repeated continuously in a programming loop as shown figuratively in FIG. 12 providing continual monitoring of the detection area when the detection system is engaged.

In rare instances, even with the configuration of the sensor clusters of the present detection system, very low obstacles or targets moving across the detection area may not be detected in the collision zone after being detected successively in the two farther zones II and III. For example, people crossing behind the vehicle while the vehicle is backing-up will be detected and then "disappear" from detection area D in successive iterations of the detection algorithm. In order to provide for this eventuality, a sub-part of the detection algorithm is a "disappearing target algorithm" which will indicate to the driver that a target obstacle has been detected in successive zones and then has "disappeared" in a subsequent iteration and signal the driver by illuminating both the yellow and red lights. In this manner, the driver will be on alert as to the possible presence of a very low and difficult to detect obstacle or an obstacle crossing the detection area. In FIG. 12 a broken line delineates the disappearing target sub-algorithm. After a target has been detected and is not detected again in the immediately following iteration, a series of decision operations are performed. If any of the lights were lit or the yellow light flashed in the immediately preceding iteration of the detection algorithm, then both the yellow and red lights are illuminated to warn the driver of an obstacle that has "disappeared." If all of the decision operations are answered in the negative, then an all clear signal is given by illuminating the green light or no light at all.

Another detection example will be described with reference to FIG. 1 in which two obstacles 68 and 70 are present in detection area D. Obstacle 68 is block shaped and is located in collision zone I, and obstacle 70 is cylindrical and is located in warning zone II. When vehicle 10 is put into reverse gear the detection system is activated. The transmitters of sensor clusters 14 and 16 transmit ultrasound signals toward detection area D and the signals are deflected off of obstacles 68 and 70 and received by the receivers of the sensor clusters. Some return signals will be received by a receiver on the same cluster that sent the signal and other return signals will be received by a receiver on the other cluster, thereby providing monostatic and bistatic operation. The computer which is located in one of the sensor clusters will calculate the distance to the closest obstacle because the return signal from the closest target will be determined by the multi-target screening technique. In this example, obstacle 68 is the closest and the distance to it will be calculated. When the detection algorithm is performed the computer will determine that obstacle 68 is located in collision zone I and will sent an output signal to the user interface to illuminate red lights 62 and to cause an audible alarm to sound from audio-visual panel 22 within the vehicle warning the motorist to stop. If obstacle 68 were not present, of course the computer would calculate the distance to obstacle 70 which is located in the warning zone II and send an output signal to the user interface to flash yellow lights 64 warning the motorist to proceed with extreme caution.

This example illustrates that the computer will receive both monostatic and bistatic return signals which provide a more accurate assessment of the detection area. It is well understood that the flow diagrams of FIGS. 12 and 13 show only the principal steps of the computer program and that many other embodiments are possible without in any way departing from the spirit of the invention. For example, there are an infinite number of thresholds possible to provide additional levels of warning to the driver.

By utilizing several transmitters and receivers or single unit transceivers in each sensor cluster, the present detection system provides the best available coverage of the area behind the vehicle. The configuration of the sensor clusters on both sides of the rear of the vehicle enables the computer through its seek-and-store detection algorithm to transmit signals from every transmitter in each array and consequently receive return signals deflected from an obstacle into every one of the available receivers, thereby being able to recognize even very small objects with odd shapes and textures. The obstacle detection system of the present invention provides multiple levels of cautionary warnings by continually monitoring the detection area. The angled, stepped configuration of the sensor clusters provide the expanded coverage of detection area D. In contrast, prior art systems which use only monostatic arrangements are susceptible to a loss of return signal due to the dispersion of sound waves away from the area of a single receiver. Even if bistatic modes were available on prior art systems, the parallel arrangement of the sensors impairs their ability to receive return signals or pulses due to their limited coverage area, especially signals or pulses deflected from oddly shaped obstacles. The availability of array sensor coverage on both sides of the vehicle ensures that the return signals will be registered in one of the available receivers. Following the detection of objects behind the vehicle and calculation of their respective distances. Results are compared with the thresholds indicating imminent collision zone I, warning zone II and a pre-warning or safe zone III. Priority is given to the object closest to the vehicle. The computer continuously outputs to the user interface by means of the red, yellow and green lights whether an object is present in which zone.

Exterior visual indicators 18 and 20 are attached to the sides of the vehicle so that their lights are viewed in the side view mirrors visible to the motorist while maneuvering in reverse. The preferred orientation of indicators 18 and 20 are within 15° vertically and within 15° horizontally of the driver's line of sight of the side view mirrors. Additional visual display and audio tone warning is located on audio-visual panel 22 in the cab sounding alarms. Panel 22 may also include a series of lights which communicate visually as well.

While in the preferred embodiment transmitters and receivers or single unit transceivers are constituted by an ultrasonic detectors, it will clearly be understood that sonic, optical infrared, RF, and radar detectors are equally suitable.

The detection algorithm described herein pertains to the preferred embodiment of the invention. It will be understood that alternative algorithms may be formulated and used with the detection system components of the present invention.

From the foregoing detailed description, it will be evident that there are a number of changes, adaptations, and modifications of the present invention which come within the province of those skilled in the art. However, it is intended that all such variations not departing from the spirit of the invention be considered as within the scope thereof as limited solely by the claims appended hereto.

We claim:

1. An obstacle detection system for a vehicle moving in reverse for warning a driver of obstacles in a detection area to the rear of the vehicle, said detection system comprising:

an angled, stepped sensor cluster adapted to be attached to the rear of the vehicle, said sensor cluster comprising an array of signal transmitting means for transmitting signals from the rear of the vehicle and an array of signal receiving means for receiving return signals deflected from a target object located in the detection area;

detection means coupled to said transmitting means and said receiving means for detecting the presence of a target object in the detection area iteratively, said detection means comprising multi-target screening means for screening return signals and determining one which corresponds to a closest target object, calculating means for calculating the distance from the rear of the vehicle to the closest target object, memory means for storing a first threshold value corresponding to a minimum distance allowed between an obstacle in the detection area and the rear of the vehicle, first comparator means for comparing the calculated distance to the first threshold distance and generating a first output signal if the calculated distance is less than the first threshold distance; and indication means coupled to said detection means and responsive to the first output signal for indicating to the driver to activate the brakes and stop the vehicle or signaling directly to the brake system to activate the brakes.

2. The obstacle detection system of claim 1, wherein said indication means comprises an exterior visual indicator attached to the vehicle so as to be visible to the driver through viewing a side view mirror of the vehicle.

3. The obstacle detection system of claim 2, wherein said exterior visual indicator includes a red light and a yellow light adapted to be illuminated in response to output signals from said detection means.

4. The obstacle detection system of claim 3, wherein in response to the first output signal said red light of said exterior visual indicator is illuminated signalling the driver to stop the vehicle.

5. The obstacle detection system of claim 4, wherein said indication means comprises an audible alarm which sounds only if a target object is present in the detection area in response to the first output signal alerting the driver to stop the vehicle.

6. The obstacle detection system of claim 3, wherein said memory means further comprises a second threshold value corresponding to a warning distance between an obstacle in the detection area and the rear of the vehicle, and wherein said detection means further comprises second comparator means for comparing the calculated distance to the second threshold distance and generating a second output signal if the obstacle is in a warning zone such that the calculated distance is less than the second threshold distance but greater than the first threshold distance, and said indicating means being further responsive to the second output signal for signalling the driver of an obstacle in the warning zone.

7. The obstacle detection system of claim 6, wherein in response to the second output signal said yellow light of said exterior visual indicator is intermittently illuminated signalling the driver to proceed in reverse with extreme caution.

8. The obstacle detection system of claim 7, wherein said indication means comprises an audible alarm which sounds only if a target object is present in the detection area in response to the second output signal signalling the driver to proceed in reverse with extreme caution.

9. The obstacle detection system of claim 6, wherein said memory means further comprises a third threshold value corresponding to a pre-warning distance between an obstacle in the detection area and the rear of the vehicle, and wherein said detection means further comprises third comparator means for comparing the calculated distance to the third threshold distance and generating a third output signal if the obstacle is in a pre-warning zone such that the calculated distance is less than the third threshold distance but greater than the second threshold distance, and said indicating means being further responsive to the third output signal for signalling the driver of an obstacle in the pre-warning zone.

10. The obstacle detection system of claim 9, wherein in response to the third output signal said yellow light of said exterior visual indicator is illuminated signalling the driver to proceed in reverse with caution.

11. The obstacle detection system of claim 10, wherein said indication means comprises an audible alarm which sounds only if a target object is present in the detection area in response to the third output signal signally the driver to proceed in reverse with caution.

12. The obstacle detection system of claim 9, wherein said detection means is adapted to generate a fourth output signal if the calculated distance is greater than the third threshold, and said indicating means being further responsive to the fourth output signal for signalling the driver of no obstacles detected in the detection area.

13. The obstacle detection system of claim 12, wherein said indicating means further comprises a green light on said exterior visual indicator and in response to the fourth output signal said green light is illuminated signalling the driver to proceed with normal care and caution.

14. The obstacle detection system of claim 1, wherein said indication means comprises an audible alarm alerting the driver to stop the vehicle.

15. The obstacle detection system of claim 1, comprising a pair of sensor clusters wherein one said sensor cluster is mounted to the driver's side of the rear of the vehicle and another said sensor cluster is mounted to the passenger's side of the rear of the vehicle, each said sensor cluster providing an angular coverage area, said sensor clusters angled toward each other such that their angular coverage areas intersect.

16. The obstacle detection system of claim 13, wherein the angular coverage area of each said sensor cluster is approximately 90°.

17. The obstacle detection system of claim 16, wherein the coverage area of each said sensor cluster comprises three angular coverage segments of approximately 30° each.

18. A signal transmitting and receiving apparatus for use with an obstacle detection system for a vehicle moving in reverse and adapted to be operatively coupled to a computer and an output indicator, said apparatus comprising:

a sensor cluster including an array of signal transmitters and an array of signal receivers adapted to be connected to the computer; and a housing comprising a plurality of stepped portions oriented angularly with respect to one another and a vehicle mount portion for mounting to the rear of the vehicle, said transmitters and said receivers of said sensor cluster disposed in said stepped portions of said housing so as to provide an angular area of signal transmitting and receiving coverage.

19. The apparatus of claim 18, wherein said angular area of coverage comprises a plurality of angular coverage segments, said transmitters and said receivers in each said stepped portion of said housing providing one angular coverage segment.

20. The apparatus of claim 19, wherein said angular area of coverage is approximately 90° such that the sum of said angular coverage segments equals approximately 90°.

21. The apparatus of claim 20, wherein said angular coverage segments are approximately 30° each such that three segments comprise said angular area of coverage.

* * * * *